US008065843B2

(12) United States Patent
Timothy et al.

(10) Patent No.: US 8,065,843 B2
(45) Date of Patent: Nov. 29, 2011

(54) CABLE CLEAT SYSTEM

(75) Inventors: E. Erik Timothy, Apollo Beach, FL (US); Carl Simmonds, Land O'Lakes, FL (US)

(73) Assignee: Nationwide Industries, Inc., Tampa, FL (US)

( * ) Notice: Subject to any disclaimer, the term of this patent is extended or adjusted under 35 U.S.C. 154(b) by 0 days.

(21) Appl. No.: 12/033,650

(22) Filed: Feb. 19, 2008

(65) Prior Publication Data
US 2008/0196326 A1   Aug. 21, 2008

Related U.S. Application Data

(60) Provisional application No. 60/890,272, filed on Feb. 16, 2007.

(51) Int. Cl.
*E04H 12/20* (2006.01)
(52) U.S. Cl. .......... 52/149; 52/201; 248/323; 248/208
(58) Field of Classification Search ............ 52/148, 52/149, 150, 151, 201, 210, 217, 122.1, 127.7, 52/169.12; 248/327, 323, 208, 236, 301, 248/304, 339; 403/113, 116, 98
See application file for complete search history.

(56) References Cited

U.S. PATENT DOCUMENTS

| | | | | |
|---|---|---|---|---|
| 188,442 A * | 3/1877 | Tobin | | 52/149 |
| 337,225 A * | 3/1886 | Anderson | | 248/208 |
| 720,025 A * | 2/1903 | Harbold | | 52/148 |
| 957,823 A * | 5/1910 | Viles | | 403/46 |
| 1,214,057 A * | 1/1917 | Moore | | 47/40 |
| 1,273,922 A * | 7/1918 | Prattinger | | 24/135 N |
| 1,370,544 A * | 3/1921 | Leeper | | 24/135 R |
| 1,671,867 A * | 5/1928 | Mample et al. | | 24/129 R |
| 1,793,381 A * | 2/1931 | Vanatta et al. | | 52/148 |
| 1,985,509 A * | 12/1934 | Lemont | | 403/209 |
| 2,051,230 A * | 8/1936 | Tillotson | | 52/66 |
| 2,128,030 A * | 8/1938 | Koleno | | 267/72 |
| 2,181,072 A * | 11/1939 | Sayers | | 254/134.3 PA |
| 2,300,375 A * | 10/1942 | Turner | | 52/150 |
| 2,520,055 A * | 8/1950 | Pomerance | | 135/120.2 |
| 2,837,776 A * | 6/1958 | Klein | | 52/73 |
| 2,858,917 A * | 11/1958 | Wendt | | 52/162 |
| 3,108,344 A * | 10/1963 | Bethea | | 403/373 |
| 3,245,649 A * | 4/1966 | Eric et al. | | 24/68 R |
| 3,280,521 A * | 10/1966 | Keathly | | 52/40 |
| 3,402,518 A * | 9/1968 | Lettunich | | 52/149 |
| 3,504,460 A * | 4/1970 | Solberg | | 52/98 |
| 3,585,884 A * | 6/1971 | Leckie et al. | | 81/13 |
| 3,724,151 A * | 4/1973 | Kaywood et al. | | 52/295 |
| 3,751,866 A * | 8/1973 | Renchen | | 52/149 |
| 3,770,307 A * | 11/1973 | Van Gompel | | 292/307 R |
| 3,830,457 A * | 8/1974 | Stewart | | 248/499 |
| 3,841,510 A * | 10/1974 | Walton et al. | | 414/514 |
| 4,079,556 A * | 3/1978 | Luck et al. | | 52/127.2 |
| 4,180,952 A * | 1/1980 | Vanderlyn | | 52/148 |
| 4,195,798 A * | 4/1980 | Costantino et al. | | 244/1 TD |
| 4,240,184 A * | 12/1980 | Delhees et al. | | 24/279 |

(Continued)

*Primary Examiner* — Eileen D Lillis
*Assistant Examiner* — James Ference
(74) *Attorney, Agent, or Firm* — George R. McGuire; Blaine T. Bettinger; Bond Schoeneck & King

(57) ABSTRACT

The present invention relates generally to a system for adjusting the length and tension of a cable that is used to support another structure, such as bay and bow windows and, more particularly, to such a system that is easily micro-adjustable as well as macro-adjustable.

10 Claims, 5 Drawing Sheets

U.S. PATENT DOCUMENTS

| | | | | |
|---|---|---|---|---|
| 4,272,933 A | * | 6/1981 | Lopes | 52/149 |
| 4,337,764 A | * | 7/1982 | Lerman | 602/26 |
| 4,354,398 A | * | 10/1982 | Porter | 74/501.6 |
| 4,641,807 A | * | 2/1987 | Phillips | 248/480 |
| 4,747,631 A | * | 5/1988 | Loynes et al. | 292/307 R |
| 4,811,752 A | * | 3/1989 | Lyons et al. | 137/77 |
| 5,001,875 A | | 3/1991 | Cacioppo | |
| 5,052,648 A | * | 10/1991 | Landau | 248/235 |
| 5,352,003 A | * | 10/1994 | Bystry | 292/323 |
| 5,525,013 A | * | 6/1996 | Seegmiller et al. | 405/259.3 |
| 5,533,937 A | * | 7/1996 | Patterson et al. | 474/80 |
| 5,538,300 A | * | 7/1996 | Brown | 292/307 R |
| 5,749,174 A | * | 5/1998 | Mariel | 49/352 |
| 5,749,183 A | * | 5/1998 | Wright | 52/201 |
| 5,984,380 A | * | 11/1999 | Rice | 292/1 |
| 6,076,326 A | * | 6/2000 | Gutelius et al. | 52/698 |
| 6,131,969 A | * | 10/2000 | Natkins | 292/323 |
| 6,457,754 B1 | * | 10/2002 | Bystry et al. | 292/307 R |
| 6,679,464 B1 | * | 1/2004 | King | 248/201 |
| 6,928,704 B2 | | 8/2005 | Johnson | |
| 7,097,154 B2 | * | 8/2006 | Stevens | 254/233 |
| 7,204,107 B2 | * | 4/2007 | Leyden et al. | 70/18 |
| 7,278,665 B2 | * | 10/2007 | Rogatnev | 292/307 R |
| 7,320,452 B2 | * | 1/2008 | Chen | 248/227.1 |
| 7,424,791 B2 | * | 9/2008 | Johnson | 52/201 |
| 2003/0037496 A1 | * | 2/2003 | Cappuccio | 52/291 |
| 2004/0093699 A1 | | 5/2004 | Johnson | |
| 2004/0118981 A1 | | 6/2004 | Johnson | |
| 2005/0246978 A1 | | 11/2005 | Johnson | |
| 2005/0247014 A1 | | 11/2005 | Johnson | |
| 2006/0016147 A1 | | 1/2006 | Johnson | |

* cited by examiner

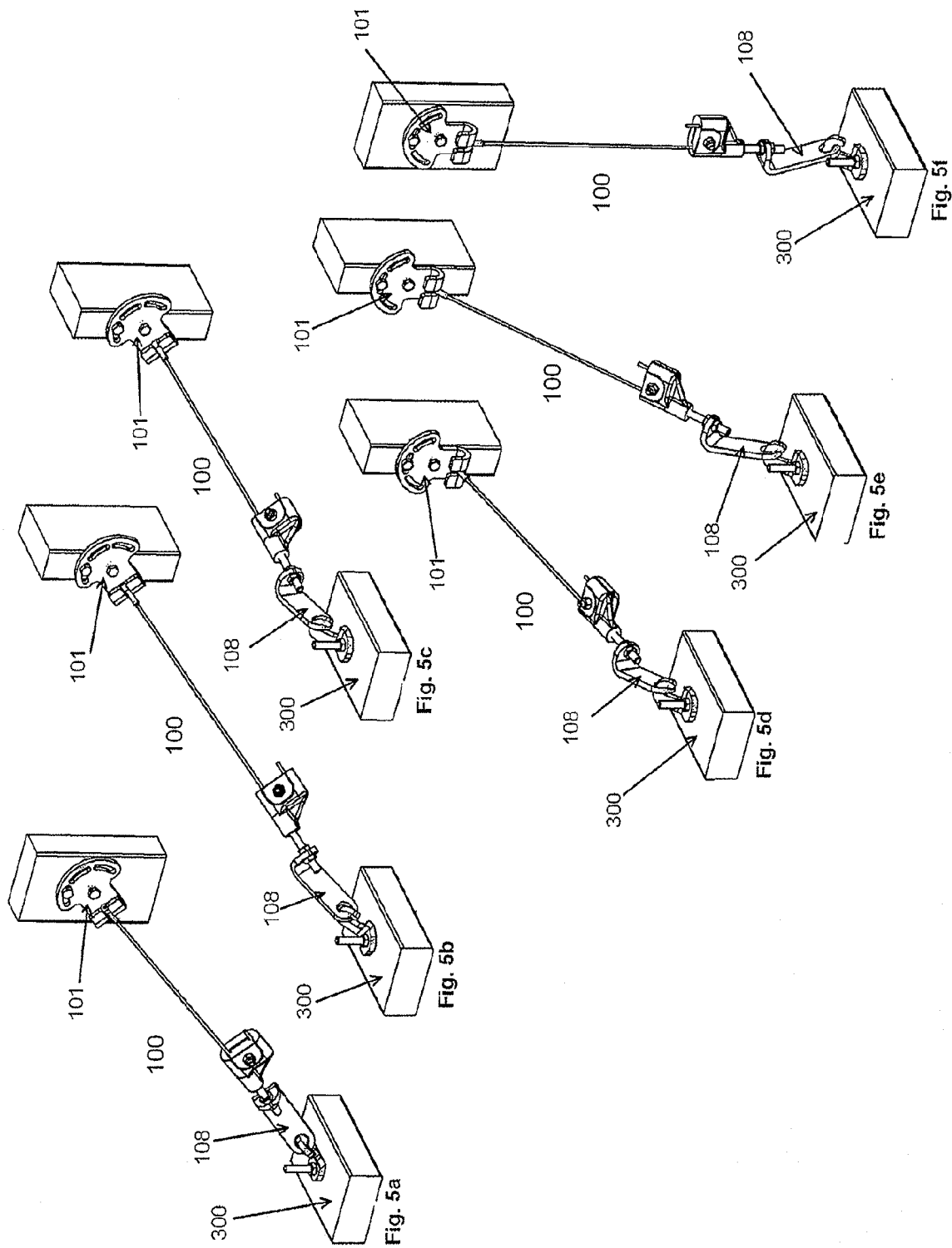

CABLE CLEAT SYSTEM

RELATED APPLICATIONS

The present application claims priority to U.S. Provisional Application Ser. No. 60/890,272, filed Feb. 16, 2007, the entirety of which is hereby incorporated by reference.

BACKGROUND OF THE INVENTION

1. Field of Invention

The present invention relates generally to a system for adjusting the length and tension of a cable that is used to support another structure, such as bay and bow windows and, more particularly, to such a system that is easily micro-adjustable as well as macro-adjustable.

2. Description of Prior Art

Bay and Bow windows are types of window units that protrude from the outside wall of a house, typically leaving a "shelf" inside the home that is surrounded by windows on three sides. Since these windows extend out from the house and generally weigh quite a few pounds (and the shelf often holds a variety household objects) it is important that these window units are properly supported. Merely attaching the window units to the front of the house is not usually enough. Most often, the window units need additional support. This additional support may be provided by a cable support system.

In a typical cable support system, one end of the system attaches to the house (either high in the wall or under the eve) and the other end attaches to the window unit at the furthest point out. Since houses and unit applications are very different, this system needs to be adjustable so that one system can be used in a variety of applications.

In particular, the typical cable support system has been one where some sort of "cleat" is attached to the house/eve and is capable of macro-adjustment (the adjustment that provides the basic cable length). The other end of this typical system has a micro-adjustment, which is used for tightening up and fine tuning the unit to give the proper dimension. This typical cable support system has been used for some time, and has been sold by many manufacturers over the years. The advantage of the system has been the simplicity of its design.

There is a disadvantage of the typical system, however, which is that it is difficult to adjust. The ideal install of the cleat is as high up on the house as possible, where the macro-adjustment is located. Thus, it often takes a very big latter to perform this adjustment. The micro-adjustment, on the other hand, is at the end of the window.

In the situation where the eve is relatively close to the window, an individual would need to maneuver in a very tight space in order to make the macro-adjustment.

Based upon this disadvantage of the prior art, it would be useful and desirable to have a cable support system that could be easily micro-adjusted and macro-adjusted, e.g., without the need to use a ladder or the need to maneuver in a very tight space in order to make the macro-adjustment.

SUMMARY OF THE INVENTION

In accordance with an embodiment of the present invention, a system for adjusting the length and tension of a cable that is used to support another structure, such as bay and bow windows and, more particularly, a system that is easily micro-adjustable as well as macro-adjustable, is provided.

In accordance with an embodiment of the present invention, a cable cleat system is provided. The cable cleat system of an embodiment of the present invention comprises a wall bracket, a cable, a cable clamp assembly, a threaded rod, a plurality of jam nuts, a hook bracket, and a window hook or bracket. The wall bracket is attachable to a wall bracket mounting surface, such as an exterior wall or eve of a house, by any fastener means (which may comprise a top fastener means and a pivot fastener means) such as wall bracket lag screws. The cable comprises a swage ball at one end of the cable which is attachable to the wall bracket. The other end of the cable is attachable to the cable clamp assembly. One end of the threaded rod is attachable to the cable clamp assembly, and the other end is attachable to the hook bracket through a threaded rod aperture by the plurality of jam nuts. The other end of the hook bracket is attachable to the window hook or bracket through a window hook or bracket aperture. The window hook or bracket is attachable to a rod or cable (which is extendable through a bow or bay window) on a window hook mounting surface of a bow or bay window by a fastener means such as a lock washer and nut.

In accordance with an embodiment of the present invention, a cable clamp assembly comprising a bolt (such as a hex head bolt), a nut (such as a hex head Nylok locknut), a clamp insert, and a clamp base is provided.

In accordance with an embodiment of the present invention, the cable clamp assembly provides the macro-adjustment capability of the cable cleat system. In order to shorten or lengthen the length of the cable (and provide macro-adjustment of the cable cleat system), the nut on the bolt needs to be loosened which releases the clamp insert within the clamp base of the cable clamp assembly. The cable can then be pulled through the clamp base in either direction to shorten or lengthen the length of the cable between the two attachment points (the wall bracket and the cable clamp assembly), and hence provide macro-adjustment of the cable cleat system. The cable clamp assembly, which provides this macro-adjustment capability, is closely located to the micro-adjustment mechanism of the cable cleat system.

In accordance with an embodiment of the present invention, the threaded rod with the plurality of jam nuts, attachable at one end to the cable clamp assembly and at the other end to the hook bracket, provides the micro-adjustment capability of the cable cleat system. In order to increase the tension in the cable (and provide micro-adjustment or fine tune the cable cleat system to give the proper dimension), the jam nuts need to be rotated (most likely in a clockwise direction) to pull the threaded rod further through the threaded rod aperture towards the window hook mounting surface and away from the wall bracket mounting surface. Alternatively, in order to decrease the tension in the cable, the jam nuts need to be rotated in the opposite direction to allow the threaded rod to be pulled through the threaded rod aperture towards the wall bracket mounting surface and away from the window hook mounting surface.

In accordance with an embodiment of the present invention, the swage ball/wall bracket design and configuration allows the wall bracket to be easily and quickly mounted in a variety of positions or angles relative to the window hook mounting surface, and provides for an easy and quick connection between the swage ball and the wall bracket. This, in turn, allows the hook bracket to be maintained in a variety of positions or angles relative to the window hook mounting surface.

In accordance with an embodiment of the present invention, the wall bracket may be easily adjusted on the wall bracket mounting surface, providing a wide variety of potential wall bracket angular positions. Elliptically-shaped wall bracket apertures in the wall bracket allow for this adjustment. A top fastener means (such as a wall bracket lag screw) may be placed within an elliptically shaped wall bracket aperture through the wall bracket mounting surface and adjusted (loosened) accordingly, without necessarily being taken fully out of an aperture, to change the wall bracket's angular position and then retightened. Also, a pivot fastener means (such as a wall bracket lag screw) may never need to be fully removed from a wall bracket aperture in the wall bracket mounting surface, and may only need to be loosened to allow angular adjustment of the wall bracket and then retightened.

In accordance with an embodiment of the present invention, the wall bracket comprises a lip portion with a groove for connecting, or holding, the swage ball on the end of the cable. Whenever a connection needs to be made between the cable with the swage ball on one end and the wall bracket, the thinner portion of the swage ball and/or cable is brought through the groove within the lip portion of the wall bracket. The swage ball is placed within the lip portion of the wall bracket after the thinner portion of the swage ball and/or cable is brought through the groove within the lip portion of the wall bracket. The redial interface of the swage ball and the tension provided by the remainder of the cable cleat system securely holds the swage ball within the lip portion of the wall bracket. This connection, as well as disconnection, can be easily and quickly made due to this design and configuration.

In accordance with an embodiment of the present invention, detailed illustrations and descriptions of various representative embodiments of the present invention are included in the attached Appendix, which is incorporated by reference in its entirety.

BRIEF DESCRIPTION OF THE DRAWINGS

The present invention will be more fully understood and appreciated by reading the following Detailed Description in conjunction with the accompanying drawings, in which:

FIGS. 5a-5f are perspective views that illustrate cable cleat systems with various hook bracket and window bracket angular configurations according to an embodiment of the present invention.

DETAILED DESCRIPTION

In accordance with an embodiment of the present invention, a system for adjusting the length and tension of a cable that is used to support another structure, such as bay and bow windows and, more particularly, a system that is easily micro-adjustable as well as macro-adjustable, is provided.

Figure 1:
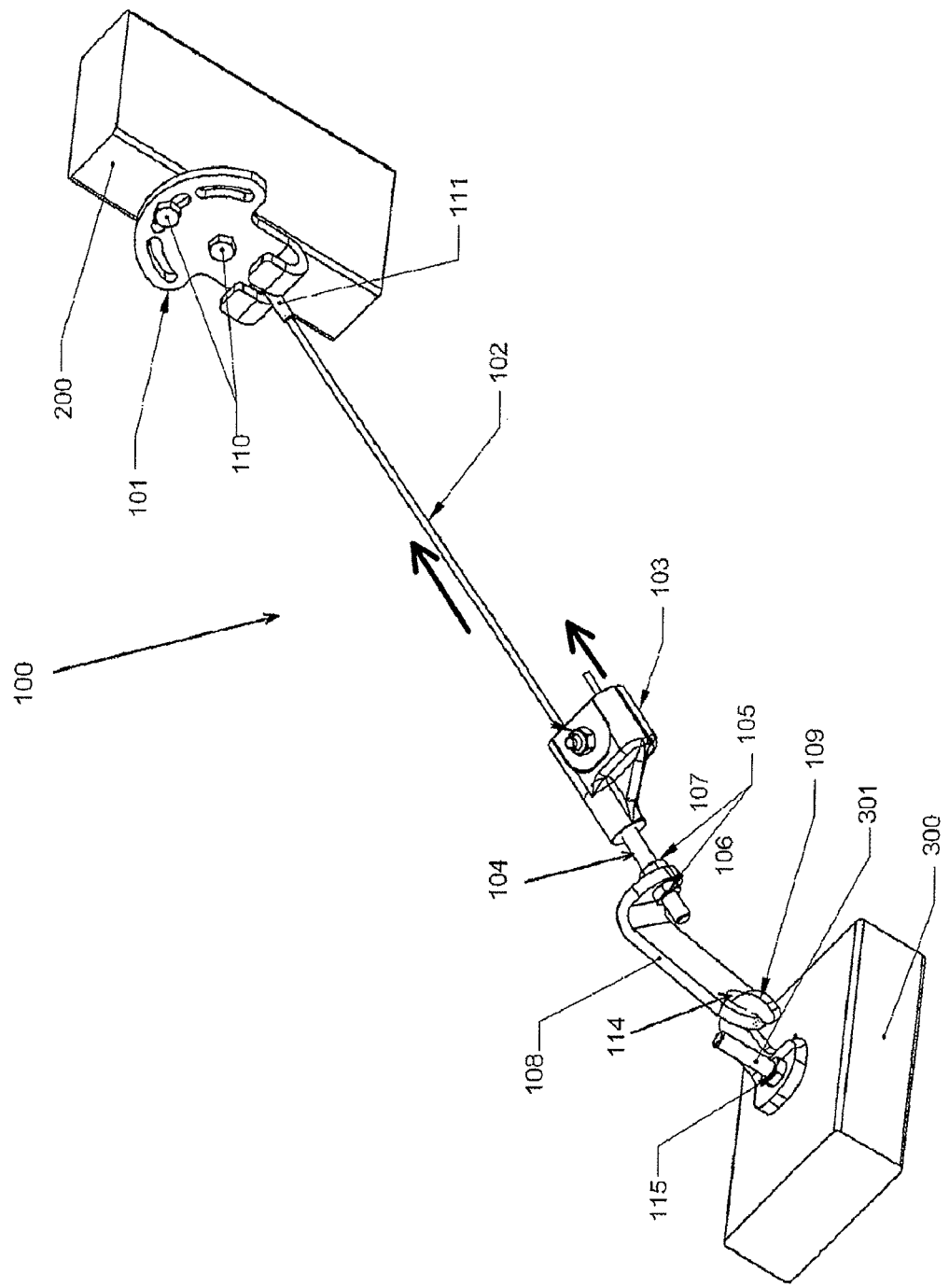
FIG. 1 is a perspective view that illustrates a cable cleat system attached to a wall bracket mounting surface of an exterior wall of a house or other building and a window hook mounting surface of a bow or bay window according to an embodiment of the present invention.

Turning to FIG. 1, a cable cleat system 100 attached to a wall bracket mounting surface 200 of an exterior wall of a house or other building (not shown) and a window hook mounting surface 300 of a bow or bay window (not shown) according to an embodiment of the present invention, is illustrated. This embodiment shows a cable cleat system 100 comprising a wall bracket 101, a cable 102, a cable clamp assembly 103, a threaded rod 104, a plurality of jam nuts 105, a hook bracket 108, and a window hook or bracket 109. The wall bracket 101 is attached to a wall bracket mounting surface 200, such as an exterior wall or eve of a house, by any fastener means 110 (which may comprise a top fastener means 122 and a pivot fastener means 121, as shown in FIG. 4b) such as wall bracket lag screws. The cable 102 comprises a swage ball 111 at one end of the cable which is attached to the wall bracket 101. The other end of the cable 102 is attached to the cable clamp assembly 103. One end of the threaded rod 104 is attached to (threaded within a threaded aperture or space, not shown) the cable clamp assembly 103, and the other end is attached to the hook bracket 108 through a threaded rod aperture 113 (not shown) by the plurality of jam nuts 105. The plurality of jam nuts 105 comprises a proximal jam nut 106 (the jam nut that is closest to the window hook mounting surface 300) and a distal jam nut 107 (the jam nut that is furthest from the window hook mounting surface 300). The other end of the hook bracket 108 is attached to the window hook or bracket 109 through a window hook or bracket aperture 114. The window hook or bracket 109 is attached to a rod or cable 301 (which is extendable through a bow or bay window, not shown) on a window hook mounting surface 300 of a bow or bay window (not shown), through a rod or cable aperture 116 (not shown) by a fastener means 115 such as a lock washer and nut.

Figure 2:
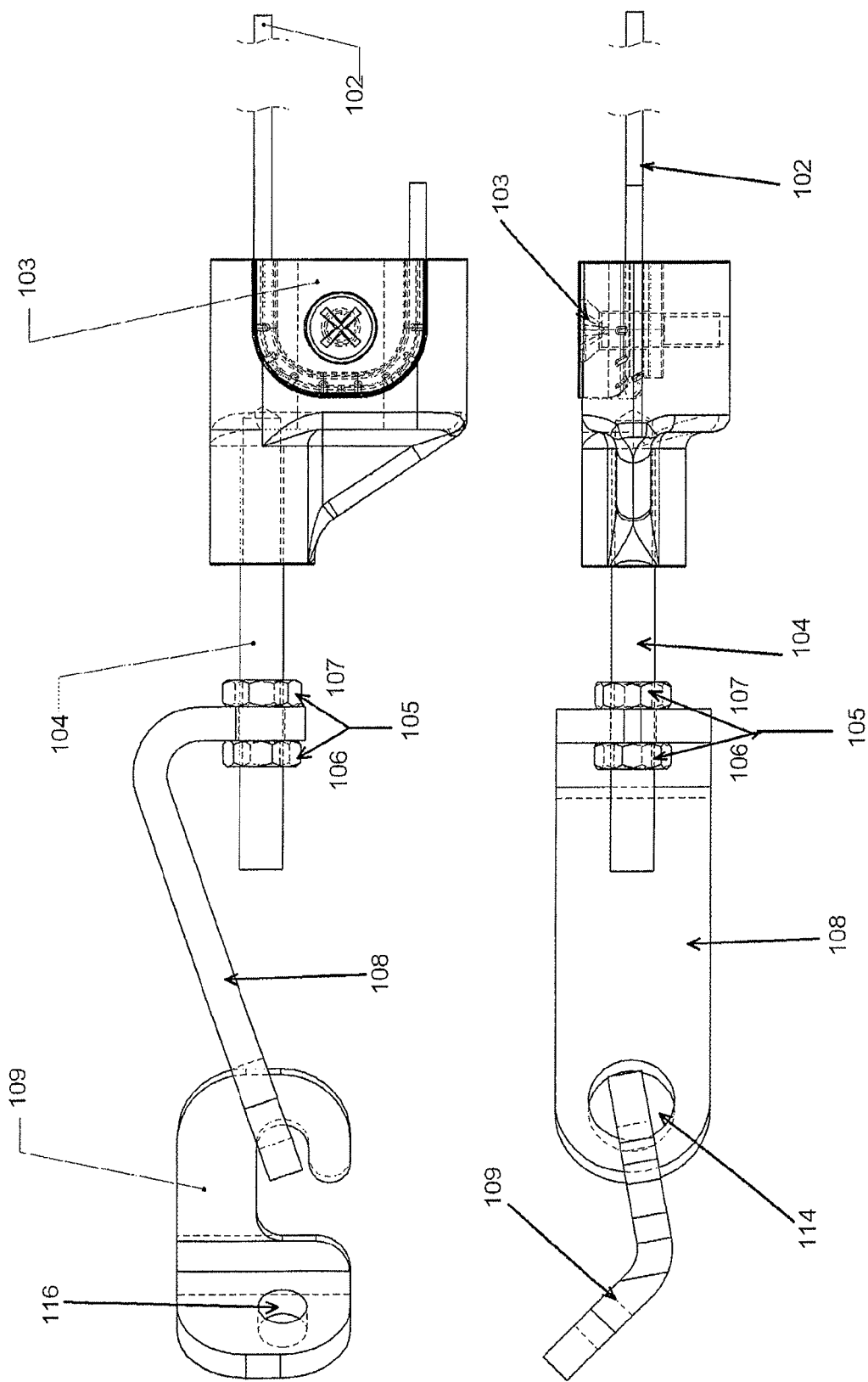
FIG. 2a is a top view that illustrates part of a cable cleat system according to an embodiment of the present invention.
FIG. 2b is a side view that illustrates part of a cable cleat system as shown in FIG. 2 according to an embodiment of the present invention.

Turning to FIG. 2a, part of a cable cleat system 100 according to an embodiment of the present invention is illustrated. This embodiment shows a top view of the cable cleat system 100 comprising a cable 102, a cable clamp assembly 103, a threaded rod 104, a plurality of jam nuts 105 (comprising a proximal jam nut 106 and a distal jam nut 107), a hook bracket 108, a window hook or bracket 109, and a rod or cable aperture 116.

Turning to FIG. 2b, part of a cable cleat system 100 according to an embodiment of the present invention is illustrated. This embodiment shows a side view of the cable cleat system 100 comprising a cable 102, a cable clamp assembly 103, a threaded rod 104, a plurality of jam nuts 105 (comprising a proximal jam nut 106 and a distal jam nut 107), a hook bracket 108, a window hook or bracket 109, and a window hook or bracket aperture 114.

Figure 3:
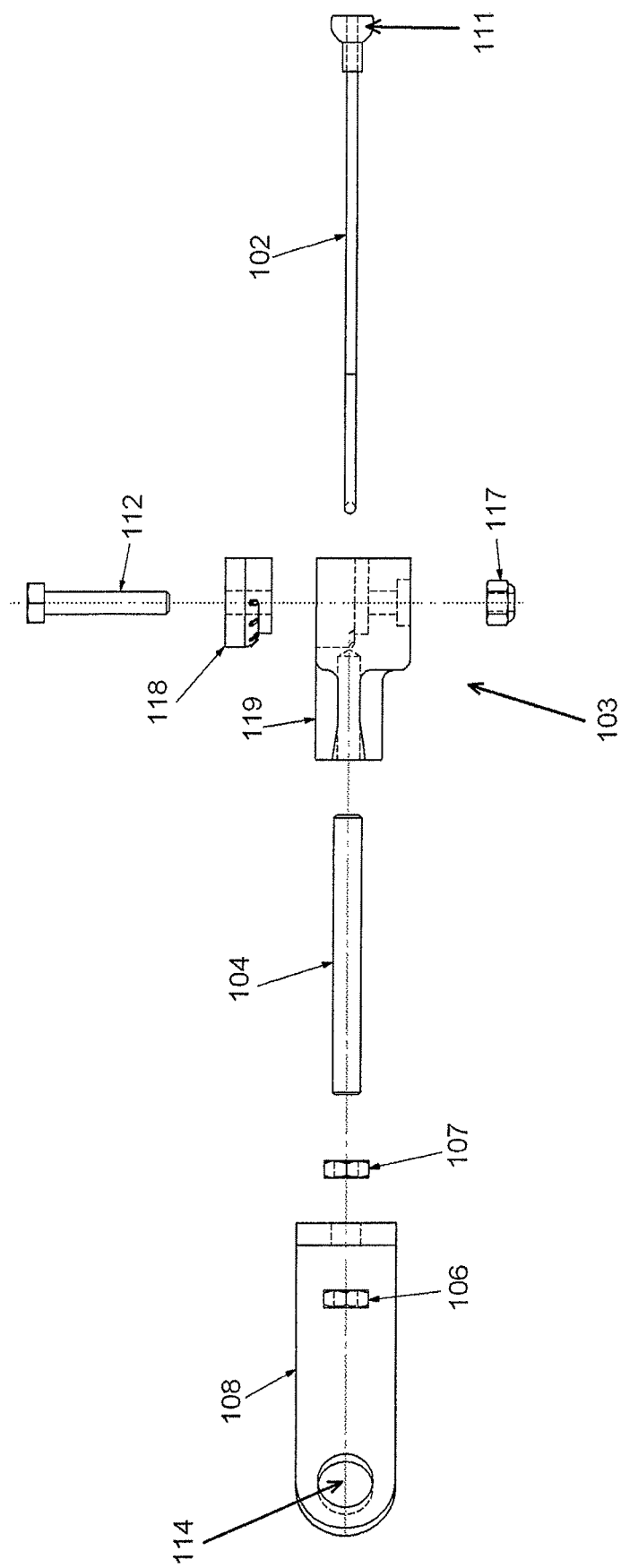
FIG. 3 is an exploded side view that illustrates part of a cable cleat system according to an embodiment of the present invention.

Turning to FIG. 3, part of a cable cleat system 100 according to an embodiment of the present invention is illustrated. This embodiment shows an exploded side view of the cable cleat system 100 comprising a cable 102 wherein the cable 102 comprises a swage ball 111 at one end. A cable clamp assembly 103 comprising a bolt 112 (such as a hex head bolt), a nut 117 (such as a hex head Nylok locknut), a clamp insert 118, and a clamp base 119 is also shown. Additionally, a threaded rod 104, a plurality of jam nuts 105 (comprising a proximal jam nut 106 and a distal jam nut 107), a hook bracket 108, and a window hook or bracket aperture 114 are shown.

In accordance with an embodiment of the present invention, the cable clamp assembly 103 provides the macro-adjustment capability of the cable cleat system 100. In order to shorten or lengthen the length of the cable 102 (and provide macro-adjustment of the cable cleat system 100), the nut 117 on the bolt 112 needs to be loosened which releases the clamp insert 118 within the clamp base 119 of the cable clamp assembly 103. The cable 102 can then be pulled through the clamp base 119 of the cable clamp assembly 103 in either direction (shown in FIG. 1 by two free arrows; one arrow next to the free end of the cable 102, and one arrow next to the cable portion which is attached to the wall bracket 101 at one end and the cable clamp assembly 103 at the other end) to shorten or lengthen the length of the cable 102 between the two attachment points (the wall bracket 101 and the cable clamp assembly 103), and hence provide macro-adjustment of the cable cleat system 100. The cable clamp assembly 103, which provides this macro-adjustment capability (macro-adjustment mechanism), is closely located to the micro-adjustment mechanism of the cable cleat system 100 (as discussed infra).

In accordance with an embodiment of the present invention, the threaded rod 104 with the plurality of jam nuts 105, attached at one end to the cable clamp assembly 103 and at the other end to the hook bracket 108, provides the micro-adjustment capability of the cable cleat system 100. In order to increase the tension in the cable 102 (and provide micro-adjustment or fine tune the cable cleat system 100 to give the proper dimension), the jam nuts 105 need to be rotated (most likely in a clockwise direction) to pull the threaded rod 104 further through the threaded rod aperture 113 towards the window hook mounting surface 300 and away from the wall bracket mounting surface 200. Alternatively, in order to decrease the tension in the cable 102, the jam nuts 105 need to be rotated in the opposite direction to allow the threaded rod 104 to be pulled through the threaded rod aperture 113 towards the wall bracket mounting surface 200 and away from the window hook mounting surface 300.

Figure 4A:
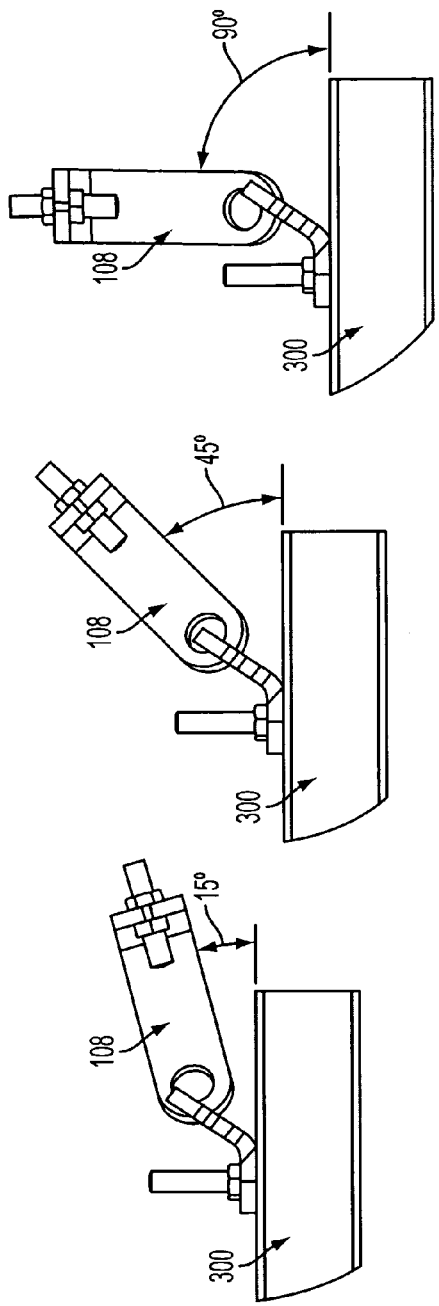
FIG. 4a is a side view that illustrates various hook bracket angular configuration according to an embodiment of the present invention.
Figure 4B:
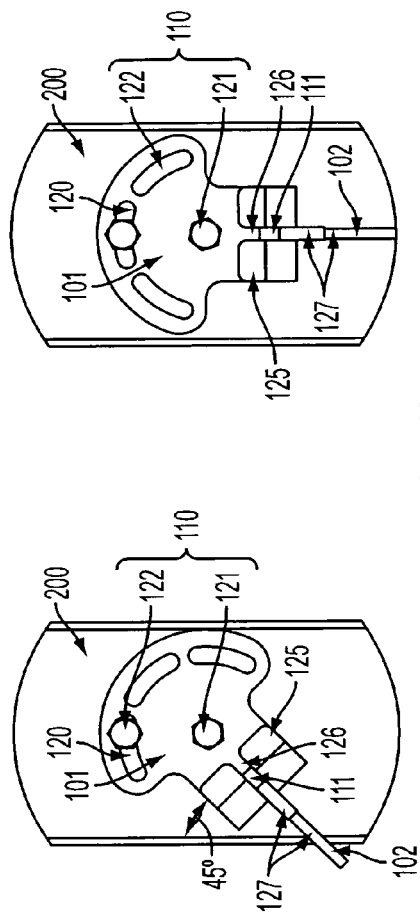
FIG. 4b is a perspective view that illustrates various window bracket angular configuration according to an embodiment of the present invention.

Turning to FIG. 4a, various hook bracket 108 angular configuration according to an embodiment of the present invention are illustrated. This embodiment shows three different angular configurations of hook brackets 108 relative to window hook mounting surfaces 300. A 15 degree, 45 degree, and 90 degree (vertical position) angular configuration from horizontal (where the window hook mounting surfaces 300 represent the horizontal plane) is shown.

Turning to FIG. 4b, various window bracket 101 angular configuration according to an embodiment of the present invention are illustrated. This embodiment shows two different angular configurations of window brackets 101 relative to window hook mounting surfaces 300 (not shown). A 45 degree and 90 degree (vertical position) angular configuration from horizontal (where the window hook mounting surfaces 300 (not shown) represent the horizontal plane) are shown.

Turning to FIGS. 5a-5f, cable cleat systems 100 with various hook bracket 108 and window bracket 101 angular configurations according to an embodiment of the present invention are illustrated. This embodiment shows five different angular configurations of hook brackets 108 and window brackets 101 relative to window hook mounting surfaces 300. All of the following angular configurations are from horizontal (where the window hook mounting surfaces 300 represent the horizontal plane): FIG. 5a shows a 90 degree hook bracket 108 and a 45 degree wall bracket 101, FIG. 5b shows a 45 degree hook bracket 108 and a 45 degree wall bracket 101, FIG. 5c shows a 15 degree hook bracket 108 and a 45 degree wall bracket 101, FIG. 5d shows a 15 degree hook bracket 108 and a 90 degree (vertical position) wall bracket 101, FIG. 5e shows a 45 degree hook bracket 108 and a 90 degree (vertical position) wall bracket 101, and FIG. 5f shows a 90 (vertical position) hook bracket 108 and a 90 degree (vertical position) wall bracket 101.

In accordance with an embodiment of the present invention, the swage ball 111/wall bracket 101 design and configuration allows the wall bracket 101 to be easily and quickly mounted in a variety of positions or angles relative to the window hook mounting surface 300 (as shown in FIG. 4b and FIGS. 5a-5f), and provides for an easy and quick connection (and disconnection) between the swage ball 111 and the wall bracket 101. This, in turn, allows the hook bracket 108 to be maintained in a variety of positions or angles relative to the window hook mounting surface 300 (as shown in FIG. 4a and FIGS. 5a-5f).

In accordance with an embodiment of the present invention, the wall bracket 101 may be easily adjusted on the wall bracket mounting surface 200, providing a wide variety of potential wall bracket 101 angular positions (See FIGS. 4b and 5a-5f). Elliptically-shaped wall bracket apertures 120 in the wall bracket 101 allow for this adjustment. A top fastener means 122 (such as a wall bracket lag screw) may be placed within an elliptically shaped wall bracket aperture 120 through the wall bracket mounting surface 200 and adjusted (loosened) accordingly, without necessarily being taken fully out of an elliptically shaped wall bracket aperture 120, to change the wall bracket's 101 angular position and then retightened. Also, a pivot fastener means 121 (such as a wall bracket lag screw) may never need to be fully removed from a wall bracket aperture 123 (not shown) in the wall bracket mounting surface 200, and may only need to be loosened to allow angular adjustment of the wall bracket 101 and then retightened.

In accordance with an embodiment of the present invention, the wall bracket 101 comprises a lip portion 125 with a groove 126 for connecting, or holding, the swage ball 111 on the end of the cable 102 (See, e.g., FIG. 4b). Whenever a connection needs to be made between the cable 102 with the swage ball 111 on one end and the wall bracket 101, the thinner portion 127 of the swage ball 111 and/or cable 102 is brought through the groove 126 within the lip portion 125 of the wall bracket 101. The swage ball 111 is placed within the lip portion 125 of the wall bracket 101 after the thinner portion 127 of the swage ball 111 and/or cable 102 is brought through the groove 126 within the lip portion 125 of the wall bracket 101. The redial interface (not shown) of the swage ball 111 and the tension provided by the remainder of the cable cleat system 100 securely holds the swage ball 111 within the lip portion 125 of the wall bracket 101. As noted supra, this connection, as well as disconnection, can be easily and quickly carried out due to this design and configuration.

What is claimed is:

1. A bay or bow window support system, comprising:
    (a) a first bracket adapted for mounting to a wall;
    (b) a cable assembly comprising a cable having a first end adapted for secure engagement with said first bracket, and an opposite second end;
    a clamp assembly comprising a first clamp member, a second clamp member comprising cable engagement means, and a tightening element bringing said first clamp member and said second clamp member together, a cable passageway having a first section and a second section, wherein said second end of said cable passes through said cable passageway defined by said first clamp member and said second clamp member where said cable is engaged by said cable engagement means, and further wherein said cable that passes through said cable passageway has a length that is adjustable beyond said second section; and
    a rod extending downwardly from said clamp assembly, and
    (c) a second bracket adapted for interconnection to the window comprising an opening through which said rod extends, fastening means for securing the position of said rod relative to said second bracket, and means for selectively adjusting the position of said rod relative to said second bracket, wherein said rod and said first section are substantially axially aligned.

2. The bay or bow window support system according to claim 1, wherein said first bracket comprises a plurality of slotted openings formed therethrough, a central opening formed therethrough, and a lip that defines a groove.

3. The bay or bow window support system according to claim 2, wherein said plurality of slotted openings are spaced relative to one another and extend along a curved axis.

4. The bay or bow window support system according to claim 3, wherein a first fastener is provided for passing through one of said plurality of slotted openings and a second fastener is provided for passing through said central opening.

5. The bay or bow window support system according to claim 2, wherein said first end of said cable includes a swage ball affixed thereto that is adapted to securely engage said groove.

6. The bay or bow window support system according to claim 1, wherein said first clamp member comprises a clamp base, said second clamp member comprises a clamp insert positioned within said base for movement therein, and said tightening element comprises a bolt for imparting movement to said clamp insert and a locking nut for securing said bolt.

7. The bay or bow window support system according to claim 6, wherein said clamp insert is adapted when tightened to engage said cable as it passes through said clamp assembly, and, when loosened, permit selective movement of said cable relative to said base.

8. The bay or bow window support window support system according to claim 6, wherein said rod includes a first end that is attached to said base and a second end that extends outwardly therefrom.

9. The bay or bow window support system according to claim 8, wherein said second end of said rod passes through said second bracket and is selectively adjustable relative to said second bracket.

10. The bay or bow window support system according to claim 9, further comprising first and second nuts that engage said rod on opposing sides of said bracket, wherein adjustment of at least one of said first and second said nuts along said rod permits selective adjustment of the rod relative to said second bracket.

* * * * *